Sept. 7, 1965   L. G. SIMJIAN   3,205,480
VERIFYING MEANS
Original Filed Jan. 26, 1959   6 Sheets-Sheet 1
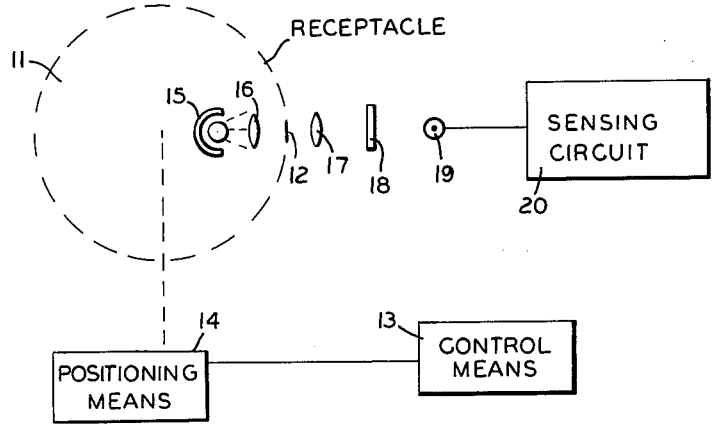
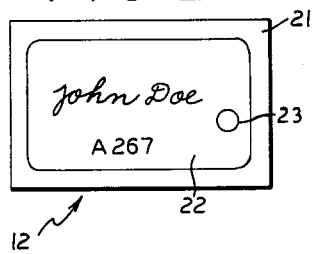
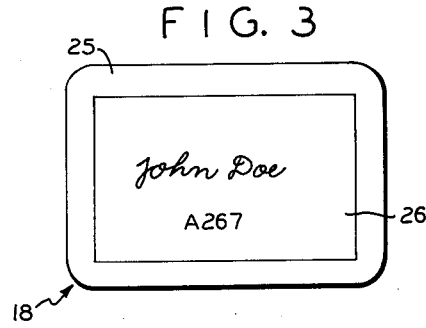
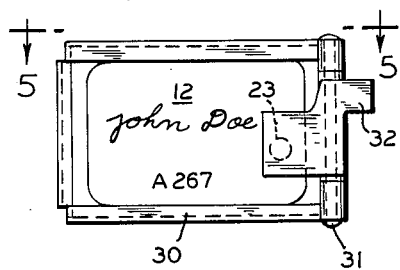
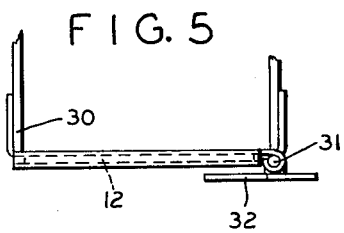
INVENTOR.
LUTHER G. SIMJIAN
BY
Ervin B. Steinberg
AGENT.

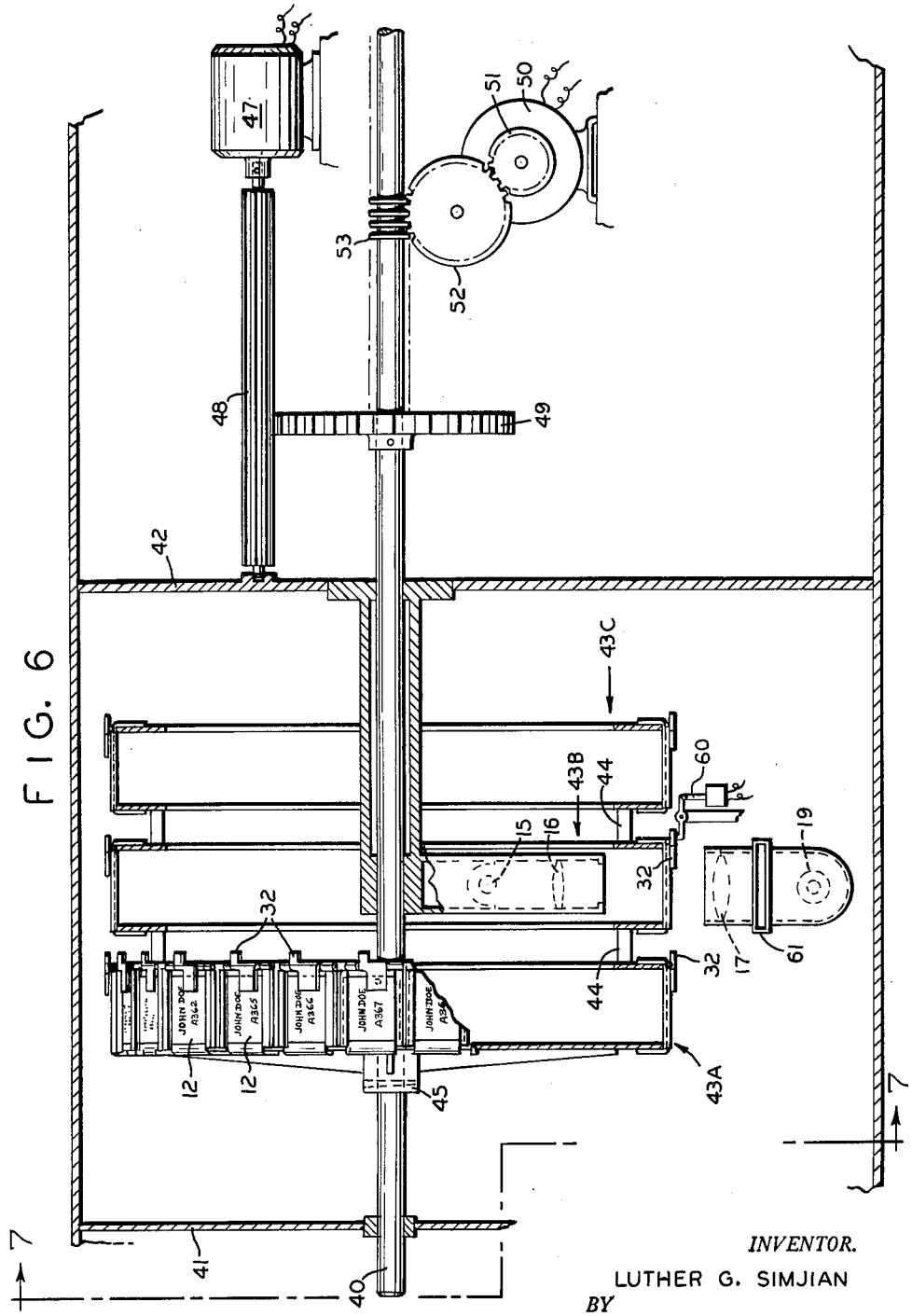

Sept. 7, 1965 L. G. SIMJIAN 3,205,480
VERIFYING MEANS
Original Filed Jan. 26, 1959 6 Sheets-Sheet 3
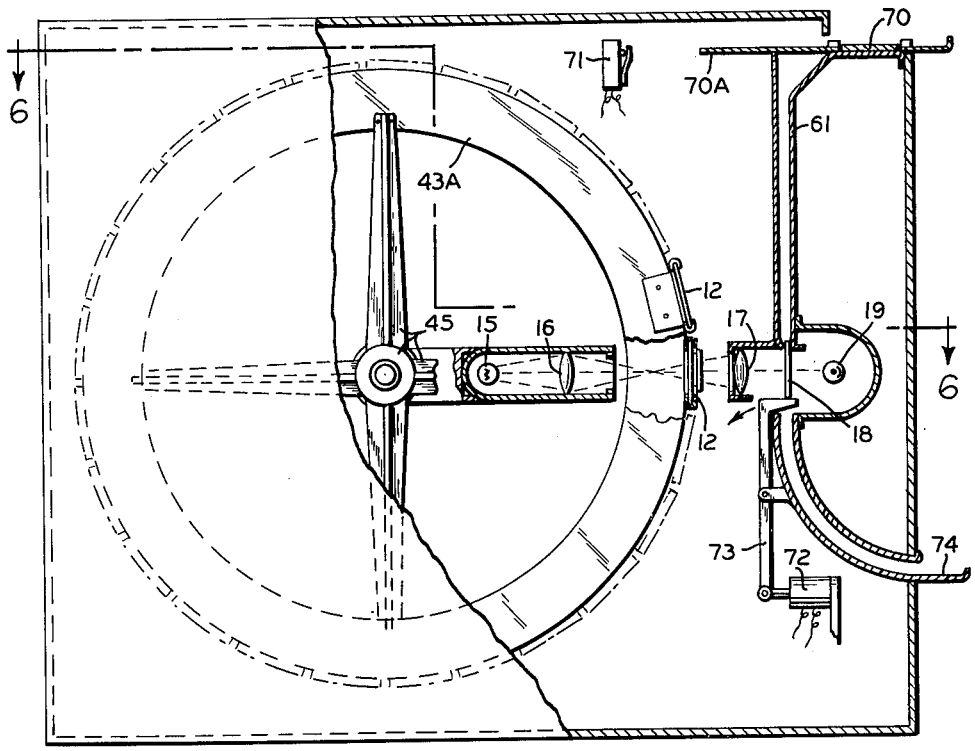
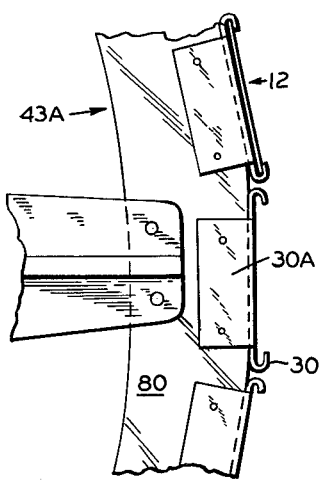
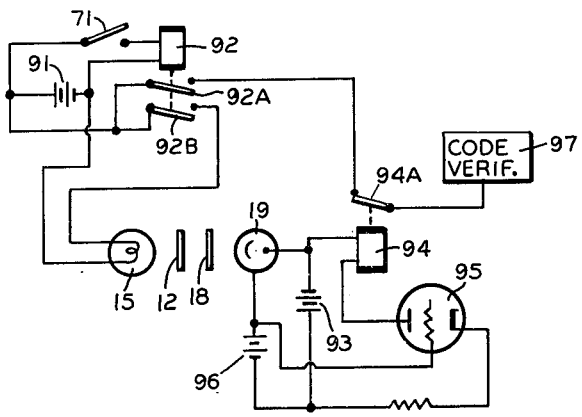
INVENTOR.
LUTHER G. SIMJIAN
BY Erwin B. Steinberg
AGENT.

Sept. 7, 1965 L. G. SIMJIAN 3,205,480
VERIFYING MEANS
Original Filed Jan. 26, 1959 6 Sheets-Sheet 4

INVENTOR.
LUTHER G. SIMJIAN
BY
AGENT.

Sept. 7, 1965  L. G. SIMJIAN  3,205,480
VERIFYING MEANS

Original Filed Jan. 26, 1959  6 Sheets-Sheet 5

*INVENTOR.*
LUTHER G. SIMJIAN
BY
AGENT.

Sept. 7, 1965 L. G. SIMJIAN 3,205,480
VERIFYING MEANS
Original Filed Jan. 26, 1959 6 Sheets-Sheet 6
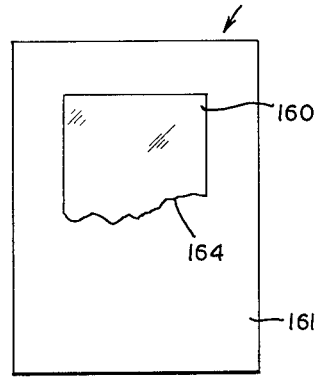
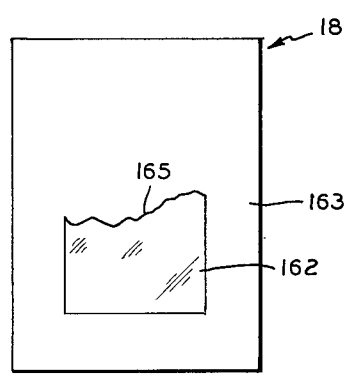
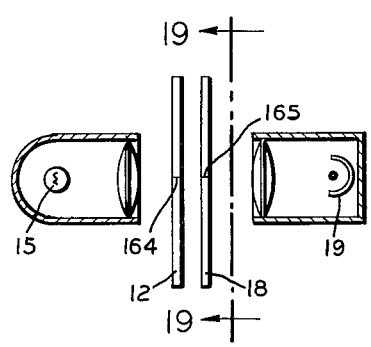
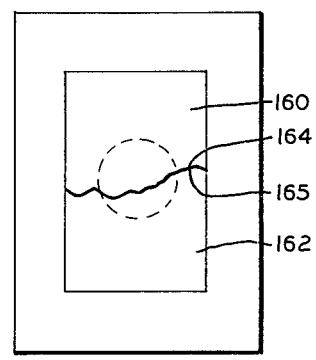
INVENTOR.
LUTHER G. SIMJIAN
BY
AGENT.

United States Patent Office 3,205,480
Patented Sept. 7, 1965

3,205,480
VERIFYING MEANS
Luther G. Simjian, Greenwich, Conn., assignor to Universal Match Corporation, St. Louis, Mo., a corporation of Delaware
Continuation of application Ser. No. 789,185, Jan. 26, 1959. This application Feb. 15, 1961, Ser. No. 90,160
14 Claims. (Cl. 340—146.3)

This application is a continuation of my copending application for Letters Patent Serial No. 789,185, filed January 26, 1959, for improvements in "Verifying Means," now abandoned.

This invention in general, is related to a method and means for automatically verifying the identity of a subscriber or member of a particular service and in a more specific manner, has reference to means for automatically checking the validity of identifying means presented to an apparatus with respect to a similar identifying means stored within the apparatus whereby a controlled instrumentality may be rendered operative depending upon the status of correlation between both identifying means.

More particularly, the instant invention is related to an attachment for certain automatic vending machines, such as check cashing machines, depository devices, etc., where trust and confidence between a plurality of subscribers and the proprietor of the machine is required and where only subscribers or customers entrusted with such confidence are entitled to make use of the machine.

When providing for instance a machine for automatically cashing checks in predetermined values, e.g. in the amounts of ten or twenty dollars, it is desired to positively identify the customer as not only being entitled to this service and confidence but also to ascertain that the customer is a member of the particular institution which renders this automated service. In order to accomplish this task the present invention embodies new and novel means for providing positive identification and verification of the subscriber and furthermore, includes means to restrict the customer or subscriber of the service to a single transaction per period of time or to cancel or temporarily suspend the subscriber's privileges. The instant invention therefore is useful in many automatic devices involving heretofore personal relationship or confrontation between two parties. Still further, the instant invention enables automation of many new services and fields of business activities.

One of the objects of this invention therefore is the provision of automatic means for identifying a customer or subscriber who is entitled to certain privileges and services while rejecting customers not entitled to such privileges.

Another object of this invention is the provision of means for comparing an identifying means carried by a subscriber with a certain identifying means disposed within the instant apparatus.

Another object of this invention is the provision of means for comparing an identifying means disposed within means for comparing an identifying means disposed within a receptacle and disposed inside the apparatus with an identifying means normally located outside the receptacle.

Another object of this invention is the provision of means for comparing an identifying means normally disposed outside an apparatus with an identifying means selected from a plurality of identifying means disposed in a receptacle of the apparatus.

Still another object of this invention is the provision of means for verifying the identity of a subscriber who carries in his possession an identifying means by comparing this identifying means with a similar identifying means disposed within an apparatus and selected by said subscriber from a plurality of similar means.

A further object of this invention is to provide means for temporarily disabling correlation between selected identification means.

Another and further object of this invention is the provision of means to selectively prevent correlation of a set of identifying means after correlation once has occurred.

Further and other objects of this invention will be apparent by reference to the following specification taken in conjunction with the accompanying drawings in which:

FIGURE 1 is a schematic block diagram of the instant device;

FIGURE 2 is a plan view of a typical identifying means disposed within the apparatus;

FIGURE 3 is a plan view of a similar identifying means which is carried and in the possession of a customer or subscriber to the service;

FIGURE 4 is a close-up view of the mounting structure supporting each identification means within the apparatus;

FIGURE 5 is a top view along lines 5—5 of FIGURE 4;

FIGURE 6 is a plan view, partly in section, along lines 6—6 of FIGURE 7 showing a typical embodiment of the receptacle which supports a plurality of identifying means.

FIGURE 7 is a side view with covers partly broken away along lines 7—7 of FIGURE 6 illustrating the coaction of the various parts in the embodiment described heretofore;

FIGURE 8 is a close-up view of certain portions of the receptacle illustrated in FIGURES 6 and 7;

FIGURE 9 is a schematic electrical circuit diagram of the means determining the existence of correlation between a set of identifying means;

FIGURE 16 is a plan view of an alternate embodiment of an identifying means disposed in the apparatus using a different means for rendering the identifying means distinct;

FIGURE 17 is a plan view of the complementary identifying means retained by the customer;

FIGURE 18 is a side view of the identifying means when aligned for testing for correlation, and FIGURE 19 is a view along section lines 19—19 of FIGURE 18.

Figure 10:
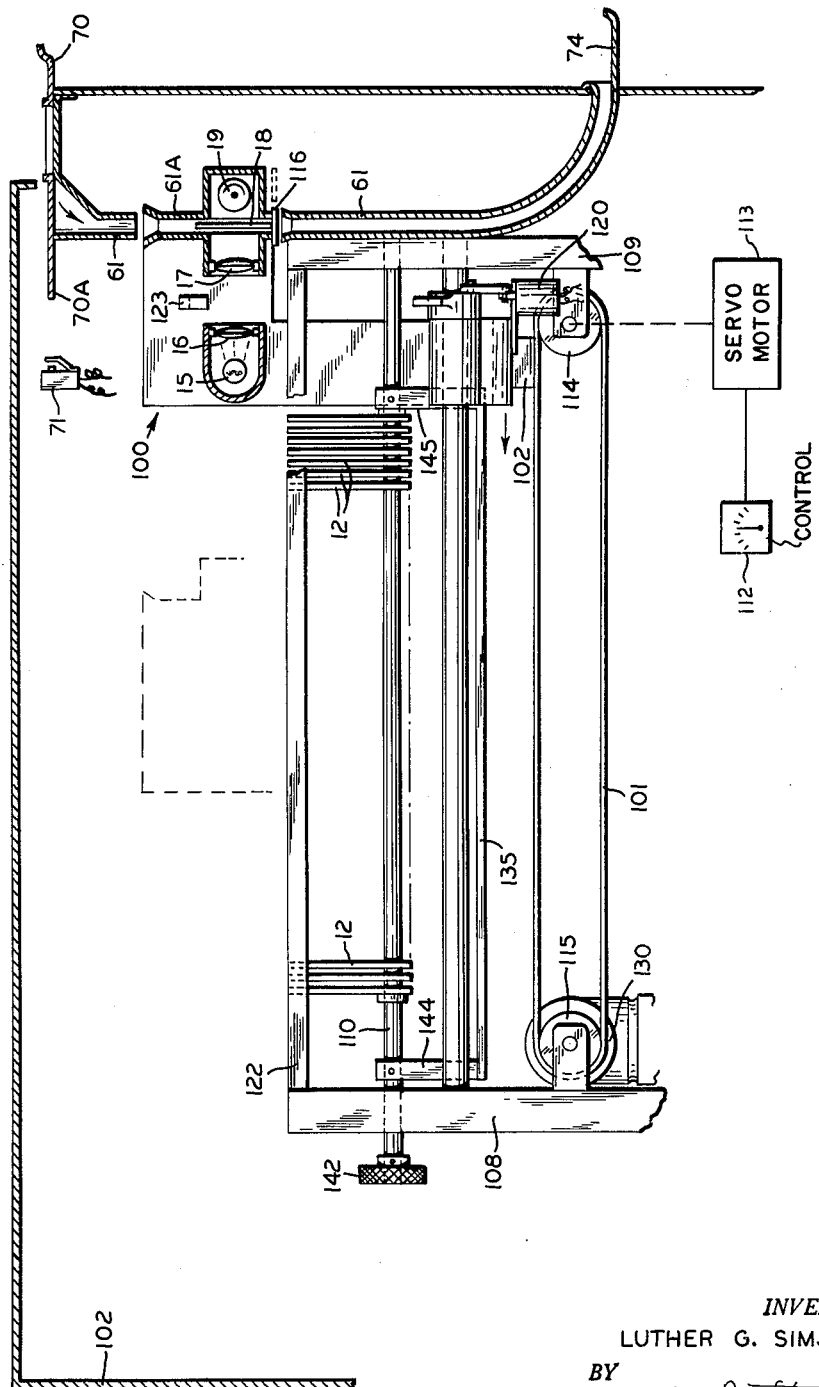
FIGURE 10 is a side view, partly in section, of an alternate embodiment of the present invention.

Referring now to the figures and FIGURE 1 in particular, the overall concept of the instant invention will be apparent.

Numeral 11 represents a receptacle which supports along its periphery a plurality of identifying means 12. A customer or subscriber operating control means 13 connected by mechanical or electrical means to a positioning means 14, for instance a motor, a synchro, a stepping switch, or similar device, positions the receptacle in such a manner that the selected identifying means is aligned in the optical path between a source of illumination 15, lenses 16 and 17, and an identifying means 18 which is normally in the possession of the person operating the machine. The status of correlation between the selected identifying means 12 supported by the receptacle and the identifying means 18 normally in the possession of the subscriber is sensed by a sensing means 19 which is connected to a sensing circuit 20. Depending upon the result of the correlation, sensing circuit 20 actuates a controlled instrumentality such as permitting or preventing the dispensing of an article of value, document, money, etc.

A typical identifying means contained in the receptacle is depicted in FIGURE 2 wherein frame 21 supports a sheet of material 22 which is provided with a signature or facsimile thereof of the subscriber, an identification number and an aperture 23. In one form of the embodiment the letters and the signature are transparent whereas the background material is opaque. Similarly, aperture 23 is transparent or may comprise a transparent portion on the sheet 22 which in general, may be considered a negative transparency.

FIGURE 3 illustrates the identifying means or card normally in possession and under the control of the subscriber. It comprises a frame 25 and a sheet of material 26 fastened therein. The latter identifying means also is provided with a facsimile of the signature, the identification number, but the sheet of material 26 preferably is a positive transparency, that is, opaque lettering on transparent background. Obviously, one or both identifying means may be laminated between a set of plastic transparent sheets to impart stiffness to each means.

It will be apparent that if the signatures are photographic reproductions from the same master, both identifying means can be positioned in such a manner as to bring the indicia thereon into optical alignment and superposed with respect to one another. When this occurs, by virtue of having provided positive and negative transparencies respectively, illumination disposed in the rear of identifying means 12, see FIGURE 1, will cause light incident upon sensing means 19 only through aperture 23. This aperture under normal conditions can be blocked so that no light will fall upon sensing means 19 provided that there is perfect match or correlation between both identifying means. When however, the subscriber's card 18 does not correlate with respect to the selected identifying means 12 within the receptacle, light will shine upon sensing means 19 and the verifying apparatus causes a blocking signal to the instrumentality to which it is connected.

It is apparent that signatures cannot readily be forged particularly when one signature must be completely identical with the other. It is for this reason that the signatures in FIGURES 2 and 3 are made from a common master or from one another. In the event an identifying means is reported lost, a new signature and new identifying means are provided. Moreover, it will be apparent that duplicate copies of identifying means 12 may be made and inserted in widely spaced machines so as to give the customer an opportunity to frequent the machine located most accessible.

FIGURES 4 and 5 illustrate the mounting of a typical identifying means within the receptacle and the coaction between the means for preventing correlation between both identifying means. Identifying means 12 is supported in a frame 30 which supports at its right side a vertical pin 31. An opaque flag or shutter 32 is disposed about the pin 31 and arranged for pivotal motion thereabout. In the position shown in FIGURE 4, shuttter 32 blocks light transmission through aperture 23. This condition may be considered the operative position. It will be understood however that by means shown more clearly on later figures, the shutter, one being associated with each frame, may be rotated ninety degrees so that light is transmitted through aperture 23 and is incident upon sensing means 19, FIGURE 1.

FIGURE 6 illustrates a typical embodiment of the receptacle which supports a plurality of identifying means. Each identifying means can selectively be brought into optical alignment with an identifying means normally disposed outside the receptacle and also into alignment with the sensing means 19. To this end a transverse shaft 40 supported for rotation and axial motion in plates 41 and 42 supports three wheel type structures 43A, 43B and 43C. These wheels are fastened to one another by support means 44 and all wheels rotate in unison with shaft 40 by virtue of supporting structure 45 which fastens wheel 43A to shaft 40.

The periphery of each of the three wheels is provided with a plurality of frames 30, each containing an identifying means 12 and shutter 32 respectively. It will be apparent that identifying means 12 disposed on the wheels, differ from one another to the extent that each identifying means is associated with a single customer and with an identifying means 18 normally disposed outside the receptacle. A motor 47 driving an elongated pinion 48 imparts rotational motion to shaft 40 by means of gear 49 fastened to shaft 40. Similarly, a motor 50 driving via gears 51 and 52 a circumferentially grooved portion 53 of shaft 40 provides longitudinal excursion of shaft 40. Stationary with respect to the shaft and the identifying means 12 there is disposed at what may be termed a "sensing station," a source of light 15, lens 16, lens 17, and sensing means 19. By virtue of rotational motion imparted to the shaft 40 via motor 47 and by axial motion imparted via motor 50, any of the identifying means disposed on the wheels 43A, B, or C, may be brought into optical alignment between illuminating means 15 and sensing means 19.

At this sensing station there is disposed also a solenoid operated actuator 60 positioned so as to readily engage any of the shutters 32 associated with the frame of the identifying means 12. When energizing actuator 60, the respective shutter is engaged at its right end and rotated by about ninety degrees so as to uncover aperture 23 of the identifying means thereby permitting light to reach sensing means 19. The identifying means disposed outside the receptacle is brought into alignment with the identifying means 12 by means of guide means comprising a rectangular channel 61, partly apertured, to permit a light path between light source 15 and sensing means 19.

FIGURE 7 more clearly illustrates the coaction between the various elements identified hereinbefore. A subscriber desiring to operate the apparatus for the purpose of correlating his identifying means must first select from data in his possession or within his knowledge, the proper identifying means disposed in the receptacle. By means of suitable control means (FIGURE 1) he then actuates motors 47 and 50 so as to position the selected identifying means 12 at the sensing station, that is, in the light path between source 15 and sensing means 19. Moreover, he places the identifying means normally under his control and possession onto a slide 70, pushes the slide momentarily inward whereby the leading edge 70A of the slide closes circuit switch 71. The slide is returned by conventional spring means (not shown). Simultaneously, the identifying means placed on the slide falls by gravity through the rectangular channel 61 to assume its position in the optical path at the sensing station. Regardless whether there is correlation or failure to establish correlation between both identifying means now disposed at the sensing station, a brief moment thereafter solenoid 72 becomes energized to actuate a tripping lever 73 to cause release of identifying means 18 and return thereof to the customer at the exit end 74 of channel structure 61. It will be apparent that the solenoid operated actuator 60 which operates the shutter associated with each identifying means may be energized each time that correlation has been established so as to prevent future correlation between the particular pair of identifying means, or that the actuator may be actuated to preclude further correlation when the privileges of a customer have been cancelled. The flags or shutters may be reset periodically, for instance every night, at which time it will be possible also to remove, insert or change the identifying means within the receptacle structure. Whenever the shutter or flag has been actuated so as to uncover the aperture on identifying means 12, light will reach sensing means 19 and operation of a subsequent controlled instrumentality is prevented. Similarly, the same condition prevails when improper identifying means or credentials are presented.

Slide 70 may be equipped with indexing means which mate with similar means on identifying means 18 to ascertain that the identifying means are of proper type, to exclude competing services, etc. in a manner which is similar to commercial charge account plates.

FIGURE 8 shows certain details of the provisions for holding frames 30 on the wheels 43. In particular, each of the wheels is equipped with a top and bottom annular rim 80 to which each of the plurality of frames is fastened using bent-over tabs 30A which form an integral part of each frame. Identification means 12 is slid into a frame by vertical insertion thereinto.

A typical schematic circuit diagram for determining correlation of the identifying means is shown in FIGURE 9. Switch 71 which is momentarily actuated by slide 70 closes a circuit via battery 91 to the coil of a time delay relay 92. Relay 92 is such that it remains, when actuated, closed for a few seconds by using for instance a dashpot structure to prevent fast drop out. As soon as relay 92 is energized, battery 91 illuminates lamp 15 via contact switch 92B. During the time that relay 92 is closed identifying means 18 inserted on the slide falls through channel 61 and assumes its position in the optical path between lamp 15 and photoelectric sensing means 19. Photoelectric tube 19 is connected to a battery 93, relay 94 and amplifying tube 95. The amplifying tube 95 having an anode, a control electrode and a cathode is normally rendered non-conductive by means of a bias battery 96 which maintains a negative potential between the control electrode and the cathode. As soon as photocell 19 receives light, the control electrode of tube 95 is rendered more positive thereby allowing conduction in tube 95 and closing the series circuit comprising anode battery 93, relay coil 94, and plate-to-cathode circuit of tube 95. The energizing of coil 94 opens the associated contact 94A thereby interrupting a signal from battery 91 via closed contact 92A to the code verification circuit 97. When circuit 97 fails to receive a signal there exists a lack of correlation between both identifying means. In the event however, that no light is received by photoelectric cell 19, relay 94 remains de-energized and circuit 97 remains connected to one side of battery 91 after relay 92 has been actuated.

It will be quite apparent that when shutters 32 are rotated to permit light through aperture 23, light will be incident upon photoelectric cell 19, thus causing actuation of relay 94 and thereby preventing circuit 97 from receiving a required signal. As has been described hereinbefore, actuator 60 may be operated after each operation, or after correlation has been established, or selectively upon instructions to temporarily lock out one or more customers. The operation of actuator 60 can readily be controlled from an additional control circuit (not shown) depending upon the desired mode of operation. Operation of solenoid 72 which causes lever 73 to release and return identifying means 18 can be controlled in many ways as for instance by timing means using a cam, by a manually controlled pushbutton, or by such other suitable means as are well known to those skilled in the art.

An alternate embodiment of the instant invention is depicted in FIGURES 10 to 15. Referring to FIGURE 10, the illumination means 15, lenses 16 and 17, sensing means 19 as well as a separable portion 61A of the channel structure 61 are mounted on a movable carriage structure, identified in general by numeral 100, which is moved in longitudinal direction by a driving belt 101 engaging the carriage structure by means of supporting means 102. The carriage is supported for longitudinal motion on carriage shafts 105 and 106, seen more clearly in FIGURES 11 to 14. A frame structure comprising in part end plates 108 and 109 supports therebetween, a longitudinal shaft 110 on which there is mounted for pivotal motion a plurality of spaced identifying means 12 of the type described in connection with the previous figures. The diagonal edge of the identifying means rests against a longitudinal bar 122, FIGURES 10, 12 and 13. The entire structure is housed in a suitable enclosure comprising in part cover 102, FIGURE 10, and may be considered the receptacle which contains the plurality of individual identifying means 12. Each of the longitudinally spaced identifying means is arranged to be brought into alignment with a similar identifying means normally disposed outside of the receptacle.

The longitudinal motion of the carriage 100 relative to the position of the individual identifying means 12 is controlled by a manually adjustable control means 112 which operates a servo motor 113 to impart rotation to pulley 114 for driving belt 101 and pulley 115.

In order to operate the instant device, the identifying means in the possession of the customer is placed onto slide 70, the slide is moved momentarily inward causing the identifying means to fall through channel 61, toward separated portion 61A and into the optical path between light source 15 and sensing means 19. The identifying means 18 is temporarily held in optical alignment by means of a stop 116. Upon adjusting control 112, carriage 100 (FIGURE 10) is driven toward the left to a position which corresponds to the position of the selected identifying means disposed within the receptacle. When the carriage has reached the predetermined position along its longitudinal excursion, the selected identifying means 12 is raised into the optical path by momentarily energizing solenoid 120 and actuating arm 121 coupled thereto. The identifying means thereby is lifted away from the support bar 122, FIGURE 13, and comes to rest against a stop 123, FIGURE 14, the stop being a part of the movable carriage structure and being approximately of the same width as the identifying means 12.

Figure 11:
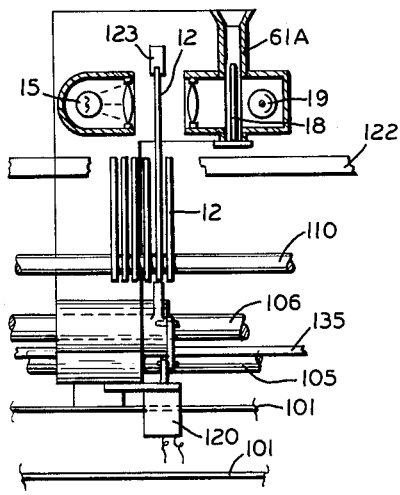
FIGURE 11 is a side view of the carriage depicted in FIGURE 10.
Figure 12:
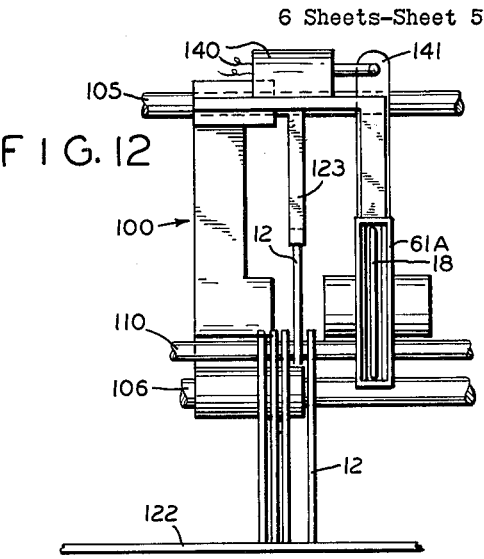
FIGURE 12 is a plan view of FIGURE 11.
Figure 13:
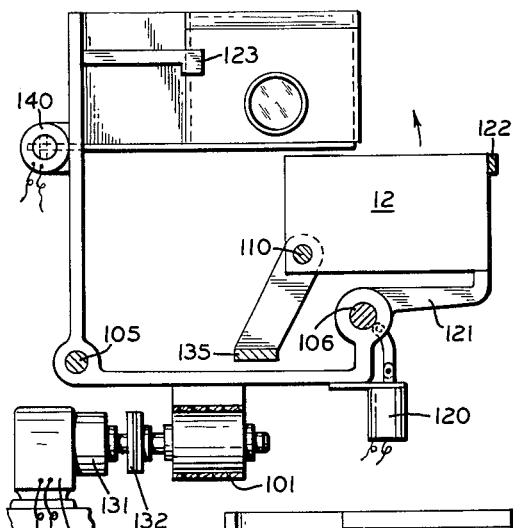
FIGURE 13 is an end view, partly in section, of the carriage and associated driving means.
Figure 14:
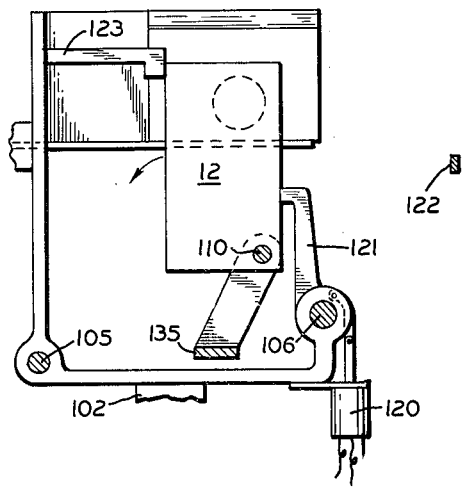
FIGURE 14 is the same view as FIGURE 13 with the identifying means moved to the verifying position.
Figure 15:
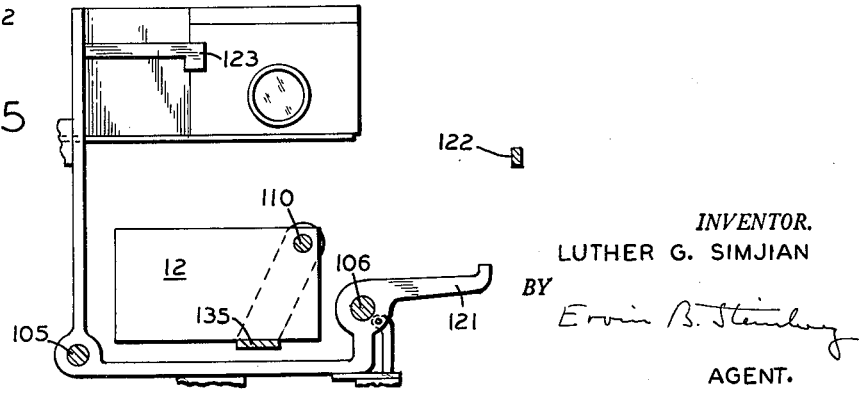
FIGURE 15 is a view similar to FIGURES 13 and 14 respectively with the identifying means moved to a position so that correlation of identifying means can no longer be accomplished.

While identifying means 12 is in the raised position as depicted in FIGURE 14, it is in optical alignment with the customer's identifying means 18 previously inserted into the optical path. It will be observed that the optical relation between the illumination means and sensing means 19 is maintained at all times since the carriage travels to the position of the identifying means 12 and carries along with it the identifying means 18 normally in possession of the customer. As soon as the identifying means 12 has been raised, actuator 121 resumes its normal horizontal position as depicted in FIGURES 11, 13, and 15. When testing for correlation between identifying means 12 and 18 has occurred, motor 130 (FIGURE 13), coupled to a gear reduction 131 and connected to slip clutch 132 drives the belt 101 in opposite direction to return the carriage to its starting position as shown in FIGURE 10. As the carriage 100 with its stop 123 moves away from the raised identifying means 12, there is no longer a vertical support for the identifying means 12, causing it to drop in counter-clockwise direction to a rest bar 135, FIGURES 10 and 15, thereby assuming a third position from which the identifying means cannot be raised by means described hereinbefore but must be reset to the first described position. In this manner, as soon as the card once has been raised for the purpose of finding correlation, it becomes temporarily disabled for further use until it is reset by manual or automatic means. Slip clutch 132 is provided so as to permit the carriage 100 to return to its starting position from different locations along its excursion, requiring therefore only timing means to stop motor 130 after a predetermined period of time corresponding to the maximum travel time. As soon as the carriage has returned to the start position, solenoid 140 is actuated which via lever 141 moves stop 116 momentarily to the right causing identifying means 18 to drop through the lower part of channel 61 and come to rest at exit end 74 for return to the customer.

It will be seen that in this manner the identifying means 12 normally occupying the position depicted in FIGURES 10 and 13 are raised for verifying purposes to the position shown in FIGURE 14, and finally, when the carriage returns to its start position, the identifying means are dropped to the position shown in FIGURE 15, thus temporarily disabling them from further alignment and correlation with identifying means 18. When operating reset knob 142 fastened to shaft 110, bar 135 connected to shaft 110 by means of radial links 144 and 145 is raised and rotated about an arc having its axis of rotation coincident with shaft 110 thereby returning any and all identifying means 12 occupying the position shown in FIGURE 15 to their original starting position as depicted in FIGURE 13. In this manner, the combination of knob 142, links 144, 145 and stop bar 135 becomes a reset mechanism for the identifying means 12.

It will be apparent that instead of the signature and graphic data depicted in FIGURES 2 and 3, the identifying means 12 and 18 respectively may be provided with codes, indicia or other suitable means to cause them to be distinct and enable comparison to establish the existence or absence of correlation between the two instruments of identification.

FIGURES 16 to 19 disclose a further and alternate embodiment of the identifying means. It is well known that if a piece of material, such as a sheet of paper, is torn into two parts there is created between the two parts a complementary edge or border which will not match with any other edge or material except with the portion with which it originally was united. Any "doctoring" along the edge will only destroy any matching formerly existing.

Numeral 160 in FIGURE 16 identifies a piece of opaque sheet material, laminated between a set of transparent plastic plates 161 thereby constituting an identifying means 12 normally disposed in the receptacle. A similar piece of opaque sheet material 162 is laminated between a set of transparent plates 163 thereby forming the identifying means 18 normally in possession of the customer or subscriber. Both sheets 160 and 162 have a complementary border or edge, numerals 164 and 165 respectively, which has been created by severing the formerly united piece.

Identifying means 12 and 18 when positioned parallel to one another can be brought into alignment in such a manner that borders 164 and 165 are blocking light from source 15 to sensing means 19, see FIGURES 18 and 19, thus signifying their complementary character and correlation. If improper identifying means are used, such matching will not be possible.

In order to obtain proper testing, it is necessary to position both identifying means accurately, preferably from their outer margins and effect severance of the identifying means in generally the same area. Means for accomplishing both prerequisites are well known to those skilled in the art. It will be apparent that many other coding means may be employed in connection with the identifying means, including magnetic or electrically conductive indicia, perforated pass cards, color code and sensing means and many others. In all cases it will be understood however that the identifying means disposed in the possession of the subscriber must be correlated and matched with a similar identifying means, the latter being normally inaccessible to the customer or subscriber.

In order to achieve accurate alignment of both identifying means without the use of expensive positioning means, the foregoing illustrations may be modified to include manually operated controls which enable the subscriber to bring the identifying means normally under his control into alignment with the identifying means disposed in the receptacle. Such control means include positioning means to vary the position of identifying means 18 relative to means 12. In this manner, the subscriber is used to perform an important step in the test for correlation between a set of identifying means.

From the foregoing disclosure it will be clearly apparent that the instant device performs a most useful function in conjunction with automatic vending machines, providing important safeguards to subscriber and proprietor alike. The verifying device described thus greatly enhances the application and usefulness of many types of services involving trust and confidence between two parties.

While there have been described and illustrated certain embodiments of the present invention, it will be apparent to those skilled in the art that various other changes and modifications may be made therein without deviating from the intent and spirit of the invention which shall be limited only by the scope of the appended claims.

What is claimed is:

1. A verifying apparatus for use by a subscriber comprising:
   an enclosure;
   a receptacle in said enclosure for supporting inaccessible to the subscriber a plurality of first identifying means;
   each of said first identifying means provided with indicia which render such means distinctive from other and similar first identifying means within said plurality;
   a receiving means disposed on said enclosure adapted to receive from the subscriber a second identifying means which is provided with identifying indicia;
   a sensing means in said enclosure;
   means causing said second identifying means when received by said receiving means to be in communication with said sensing means;
   control means connected to the receptacle and operable by the depositor for causing selectively one of said first identifying means to be in communication with said sensing means;
   further control means connected to said sensing means and adapted to determine correlation of the respective indicia when one of said first and a second identifying means are in communication with said sensing means, and
   means connected to said receiving means for rendering said second identifying means available for return to the depositor subsequent to the actuation of said further means.

2. A verifying apparatus for use by a subscriber as set forth in claim 1 wherein means are included to provide relative motion between the receptacle and the sensing station to cause in response to the operation of said control means a selected first identifying means to be in communication with the sensing means.

3. A verifying apparatus as set forth in claim 1 wherein said indicia include a facsimile of the signature of the subscriber.

4. A verifying apparatus for use by a subscriber comprising:
   an enclosure;
   a receptacle in said enclosure for supporting inaccessible to the subscriber a plurality of first identifying means;
   each of said first identifying means supported by the receptacle and provided with indicia which render such means distinctive from other and similar first identifying means within said plurality;
   a sensing station including sensing means disposed in said enclosure;
   receiving means disposed on said enclosure adapted to receive from the subscriber a second identifying means which is provided with identifying indicia;
   means causing said second identifying means when received by said receiving means to be disposed at the sensing station and in communication with said sensing means;
   motive means for providing relative motion between the receptacle and sensing station;

control means connected to the motive means and operable by the depositor for causing selectively one of said first identifying means to be in communication with said sensing means;

further control means connected to said sensing means and adapted to determine correlation of the respective indicia when one of said first and a second identifying means are in communication with said sensing means, and means connected to said sensing station for rendering said second identifying means available for return to the depositor subsequent to the actuation of said further means.

5. A verifying apparatus as set forth in claim 4 wherein said motive means move the receptacle with first identifying means relative to the sensing station.

6. A verifying apparatus as set forth in claim 4 wherein said motive means move the sensing means relative to the receptacle and first identifying means supported by the receptacle.

7. A verifying apparatus for use by a subscriber comprising:
an enclosure;
a receptacle in said enclosure for supporting inaccessible to the subscriber a plurality of first identifying means;
each of said first identifying means provided with indicia which render such means distinctive from other and similar first identifying means within said plurality;
a sensing station including sensing means forming a part of said enclosure;
receiving means disposed on said enclosure adapted to receive from the subscriber a second identifying means which is provided with identifying indicia;
means causing said second identifying means when received by said receiving means to be in communication with said sensing means;
motive means for providing relative motion between the receptacle and sensing station;
control means connected to the motive means and operable by the depositor for causing selectively one of said first identifying means to be in communication with said sensing means;
further control means connected to said sensing means and adapted to determine correlation of the respective indicia when one of said first and a second identifying means are in communication with said sensing means;
means connected to said sensing station for rendering said second identifying means available for return to the depositor subsequent to the actuation of said further means,
and means adapted to act upon said first identifying means to preclude the status of correlation between its indicia and that of the second identifying means.

8. A verifying apparatus for use by a subscriber comprising:
an enclosure;
a receptacle in said enclosure for supporting inaccessible to the subscriber a plurality of first identifying means;
each of said first identifying means removably fastened to the receptacle and provided with indicia which render such means distinctive from other and similar first identifying means within said plurality;
a sensing station including sensing means forming a part of said enclosure;
receiving means disposed on said enclosure adapted to receive from the subscriber a second identifying means which is provided with identifying indicia;
means causing said second identifying means when received by said receiving means to be in communication with said sensing means;
motive means for providing relative motion between the receptacle and sensing station;
control means connected to the motive means and operable by the depositor for causing selectively one of said first identifying means to be in communication with said sensing means;
further control means connected to said sensing means and adapted to determine correlation of the respective indicia when one of said first and a second identifying means are in communication with said sensing means;
means connected to said sensing station for rendering said second identifying means available for return to the depositor subsequent to the actuation of said further means,
and means adapted to act upon said first identifying means in response to the operation of said further control means to preclude the status of correlation between the indicia of the selected first identifying means and that of the second identifying means.

9. A verifying apparatus for use by a subscriber as set forth in claim 8 wherein said first and second identifying means comprise transparencies and said means adapted to act upon each first identifying means comprise a movable light intercepting flag.

10. A verifying apparatus for use by a subscriber as set forth in claim 8 wherein said means adapted to act upon each of said first identifying means comprises means for changing the position of the respective first identifying means in the receptacle.

11. A verifying apparatus for use by a subscriber comprising:
an enclosure;
a movable receptacle disposed in said enclosure for supporting inaccessible to the subscriber a plurality of partially transparent first identifying means;
each of said first identifying means removably fastened to the receptacle and provided with a pattern of transparent and opaque indicia which renders such means distinctive from other and similar first identifying means within said plurality;
a sensing station including a light source and light responsive sensing means disposed in said enclosure;
receiving means disposed on said enclosure adapted to receive from the subscriber a second partially transparent identifying means which is provided with a similar pattern of transparent and opaque identifying indicia;
means causing said second identifying means when received by said receiving means to be in communication with said sensing means;
motive means coupled to said receptacle for providing relative motion between the receptacle and sensing station;
control means connected to the motive means and operable by the depositor for causing selectively one of said first identifying means fastened to the receptacle to be in communication with said sensing means;
further control means connected to said sensing means and actuated when one of said first and a second identifying means are in communication with said sensing means to determine correlation of the respective indicia;
means for releasing said second identifying means from engagement with the receiving means for return to the depositor in response to the actuation of said further means,
and means carried by the receptacle and adapted to act upon each of said first identifying means to preclude the status of correlation between the indicia of the selected first identifying means and that of the second identifying means.

12. A verifying apparatus for use by a subscriber comprising:
an enclosure;
a receptacle disposed in said enclosure for supporting inaccessible to the subscriber a plurality of partially transparent first identifying means;

each of said first identifying means fastened to the receptacle and adapted to occupy a first, second and third position respectively;

each of said identifying means provided with a pattern of transparent and opaque indicia which renders such means distinctive from other and similar first identifying means within said plurality;

a sensing station including a light source and light responsive sensing means disposed in said enclosure;

receiving means disposed on said enclosure adapted to receive from the subscriber a second partially transparent identifying means which is provided with a similar pattern of transparent and opaque identifying indicia;

means causing said second identifying means when received by said receiving means to be in communication with said sensing means;

motive means for providing relative motion between the receptacle and sensing station;

control means connected to the motive means and operable by the depositor for causing selectively one of said first identifying means fastened to the receptacle to be moved from its first position to its second position whereby to cause said first identifying means to be in communication with said sensing means;

further control means connected to said sensing means and actuated when one of said first and a second identifying means are in communication with said sensing means to determine correlation of the respective indicia;

means for releasing said second identifying means from communication with said sensing means in response to the actuation of said further means, and means acting upon said first identifying means in response to the operation of said further control means for causing said selected first identifying means to assume its third position whereby to prevent it from being caused to assume its second position in response to the operation of said motive means.

13. A verifying apparatus for use by a subscriber as set forth in claim 12 wherein said motive means in response to the operation of said control means moves said sensing station along the receptacle to the position of said selected first identifying means.

14. A verifying means for use by a subscriber as set forth in claim 12 wherein control means are provided to reset first identifying means from the third position to the first position.

References Cited by the Examiner

UNITED STATES PATENTS

| | | | |
|---|---|---|---|
| 2,891,721 | 6/59 | Chenus | 340—149 |
| 2,982,945 | 5/61 | Larsen | 340—149 |
| 2,995,728 | 8/61 | Jacobs | 340—149 |
| 3,015,087 | 12/61 | O'Gorman | 340—149 |

MALCOLM A. MORRISON, *Primary Examiner.*

NEIL C. READ, IRVING L. SRAGOW, *Examiners.*